United States Patent
Yoo

(10) Patent No.: US 10,924,204 B2
(45) Date of Patent: Feb. 16, 2021

(54) SIGNAL TRANSMISSION DEVICE AND METHOD, AND SIGNAL RECEPTION DEVICE

(71) Applicant: Industry-University Cooperation Foundation Hanyang University, Seoul (KR)

(72) Inventor: Chang Sik Yoo, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/327,131

(22) PCT Filed: Nov. 10, 2016

(86) PCT No.: PCT/KR2016/012909
§ 371 (c)(1),
(2) Date: Feb. 21, 2019

(87) PCT Pub. No.: WO2018/038322
PCT Pub. Date: Mar. 1, 2018

(65) Prior Publication Data
US 2019/0199471 A1      Jun. 27, 2019

(30) Foreign Application Priority Data
Aug. 22, 2016  (KR) .................. 10-2016-0106038

(51) Int. Cl.
*H04L 1/00*        (2006.01)
*H04B 14/06*    (2006.01)

(52) U.S. Cl.
CPC ......... *H04L 1/0023* (2013.01); *H04B 14/066* (2013.01); *H04L 1/00* (2013.01); *H04L 1/0016* (2013.01); *H04L 1/0045* (2013.01)

(58) Field of Classification Search
None
See application file for complete search history.

(56) References Cited

U.S. PATENT DOCUMENTS 7,830,280 B2 *  11/2010  Bae .................. H03K 19/00346
                                                                 341/100
2010/0214138 A1   8/2010  Hollis
(Continued)

FOREIGN PATENT DOCUMENTS

KR    10-2007-0114235 A    11/2007
KR    10-2009-0122431 A    11/2009

OTHER PUBLICATIONS

Office Action issued from Korean Patent Application No. 10-2016-0106038 dated Jun. 20, 2017.
(Continued)

*Primary Examiner* — Phuongchau Ba Nguyen
(74) *Attorney, Agent, or Firm* — Sughrue Mion, PLLC

(57) ABSTRACT

The signal transmission device converts a K-bit original signal into an N-bit (N is greater than K) transmission signal in which the number of a logic high bit is identical to the number of a logic low bit, according to a lookup table in which a plurality of K-bit original signals are associated with a plurality of N-bit transmission signals by 1:1 correspondence, and transmit the N-bit transmission signal via N signal lines such that each line carries one bit, thereby minimizing the noise affecting the K-bit original signal.

4 Claims, 6 Drawing Sheets

(56) References Cited

U.S. PATENT DOCUMENTS

2014/0023161 A1\* 1/2014 Navid ................ H04L 1/0083
  375/285
2014/0035765 A1 2/2014 Bae et al.

OTHER PUBLICATIONS

Notice of Allowance issued from Korean Patent Application No. 10-2016-0106038 dated Jan. 25, 2018.
International Search Report of PCT/KR2016/012909 dated Apr. 25, 2017 [PCT/ISA/210].

\* cited by examiner

【Figure 1】 (PRIOR ART)
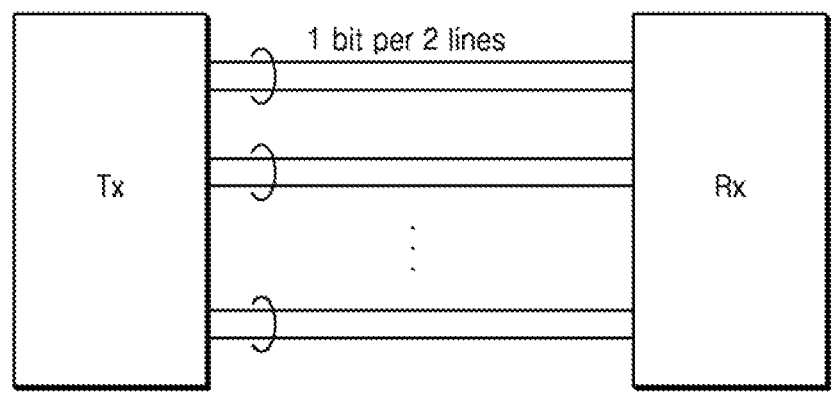

【Figure 2】 (PRIOR ART)
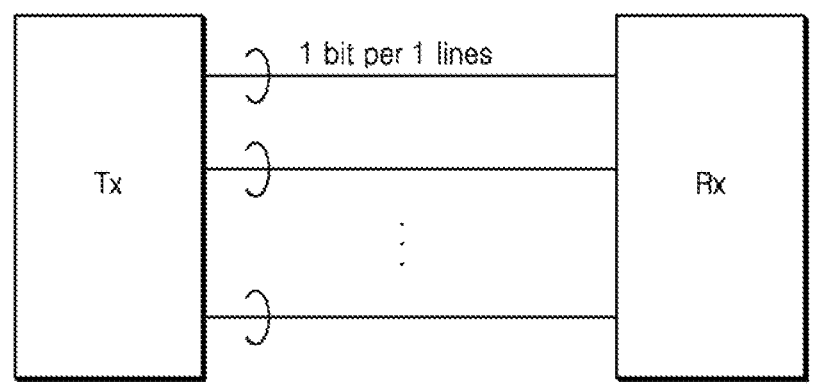

【Figure 3】
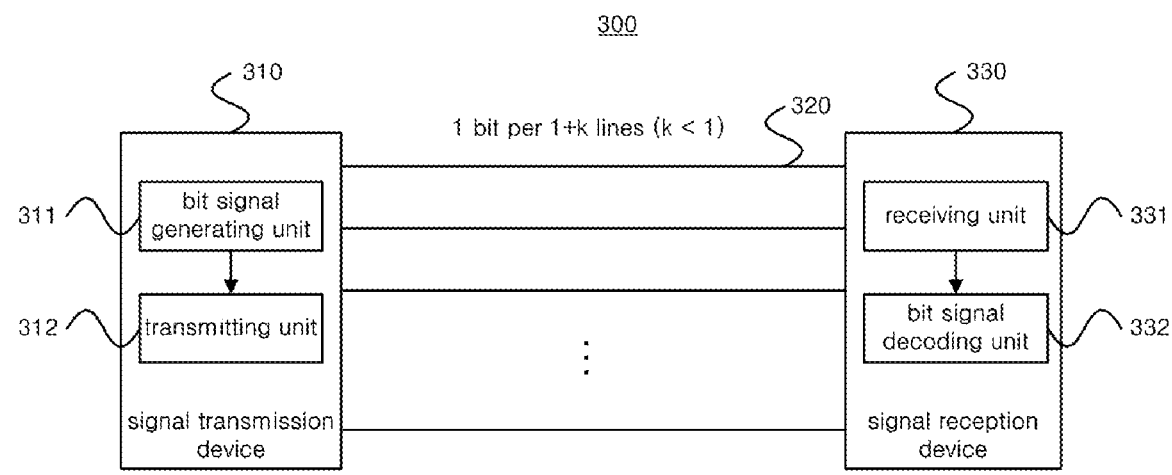

【Figure 4】

| Original Signals (K First Bit Signals) | | | |
|---|---|---|---|
| 1 | 1 | 1 | 1 |
| 1 | 1 | 1 | 0 |
| 1 | 1 | 0 | 1 |
| 1 | 1 | 0 | 0 |
| 1 | 0 | 1 | 1 |
| 1 | 0 | 1 | 0 |
| 1 | 0 | 0 | 1 |
| 1 | 0 | 0 | 0 |
| 0 | 1 | 1 | 1 |
| 0 | 1 | 1 | 0 |
| 0 | 1 | 0 | 1 |
| 0 | 1 | 0 | 0 |
| 0 | 0 | 1 | 1 |
| 0 | 0 | 1 | 0 |
| 0 | 0 | 0 | 1 |
| 0 | 0 | 0 | 0 |

| Transmission Signals (N Second Bit Signals) | | | | | |
|---|---|---|---|---|---|
| 0 | 0 | 0 | 1 | 1 | 1 |
| 0 | 1 | 1 | 1 | 0 | 0 |
| 0 | 1 | 1 | 0 | 1 | 0 |
| 1 | 1 | 1 | 0 | 0 | 0 |
| 0 | 1 | 0 | 1 | 1 | 0 |
| 1 | 1 | 0 | 1 | 0 | 0 |
| 1 | 1 | 0 | 0 | 1 | 0 |
| 1 | 1 | 0 | 0 | 0 | 1 |
| 0 | 0 | 1 | 1 | 1 | 0 |
| 1 | 0 | 1 | 1 | 0 | 0 |
| 1 | 0 | 1 | 0 | 1 | 0 |
| 1 | 0 | 1 | 0 | 0 | 1 |
| 1 | 0 | 0 | 1 | 1 | 0 |
| 1 | 0 | 0 | 1 | 0 | 1 |
| 1 | 0 | 0 | 0 | 1 | 1 |
| 0 | 1 | 1 | 0 | 0 | 1 |

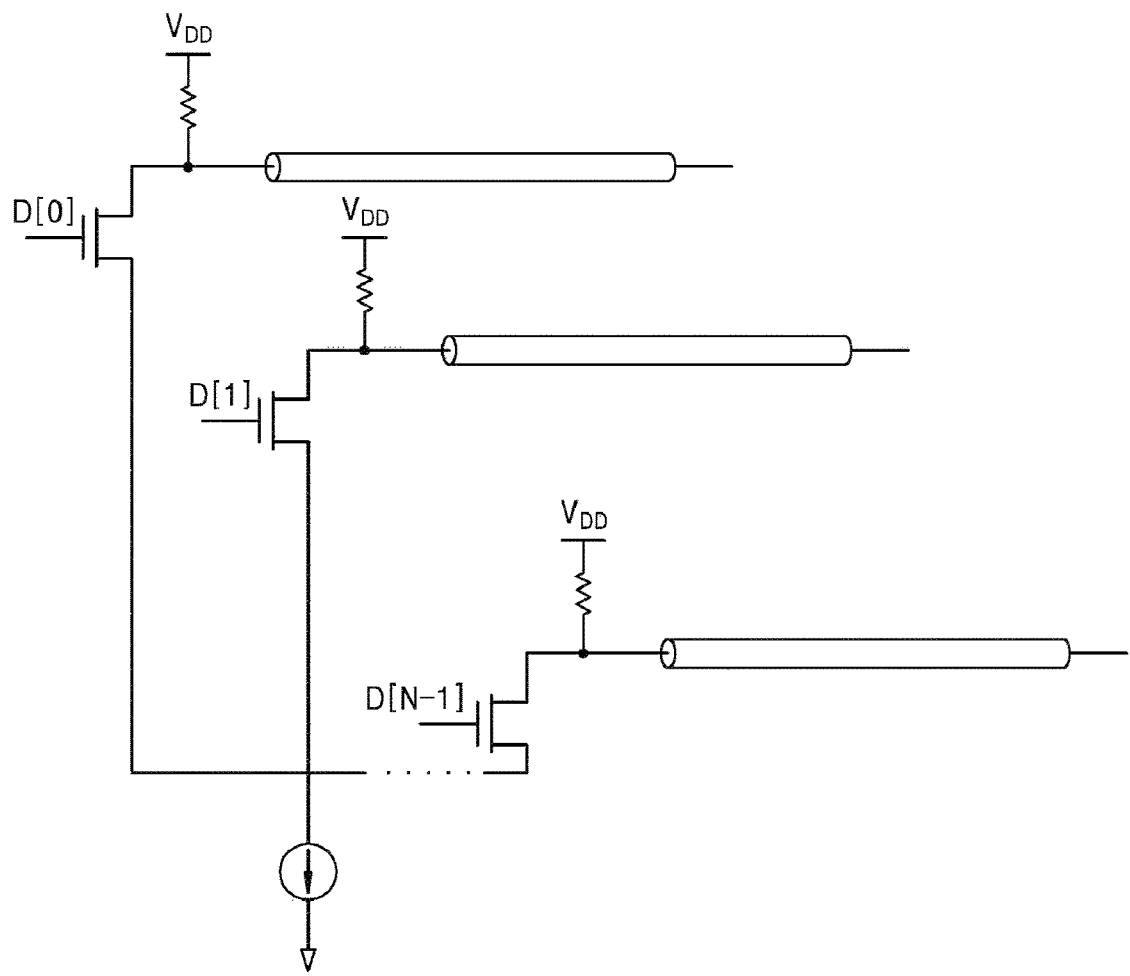
【Figure 5】

[Figure 6]
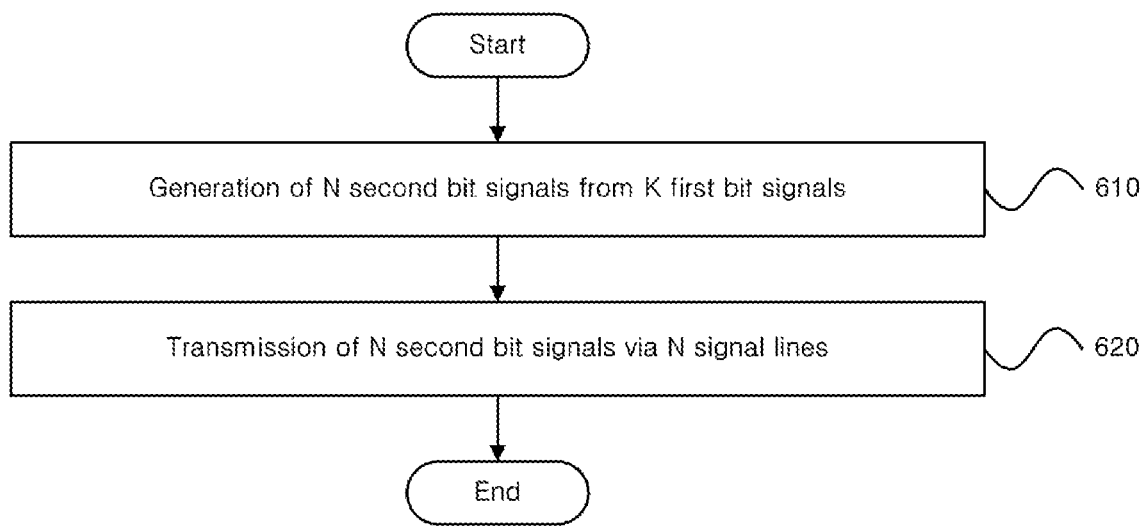

SIGNAL TRANSMISSION DEVICE AND METHOD, AND SIGNAL RECEPTION DEVICE

CROSS REFERENCE TO RELATED APPLICATIONS

This application is a National Stage of International Application No. PCT/KR2016/012909 filed Nov. 10, 2016, claiming priority based on Korean Patent Application No. 10-2016-0106038 filed Aug. 22, 2016.

TECHNICAL FIELD

The present invention relates to a signal transmission device and method, and a signal reception device, and more particularly, to a signal transmission device and method, and a signal reception device, capable of obtaining the same effect as a differential signal transmission method while using a smaller number of signal lines.

BACKGROUND ART

Conventional signal transmission devices and signal reception devices via signal lines such as cables or the like transmit and receive signals by using a single-ended signaling method or a differential signal transmitting method.

FIG. 1 is a diagram showing a schematic configuration of a signal transmission/reception system using a conventional single-ended signaling method.

Referring to FIG. 1, in a transmission reception system using a conventional single-ended signaling method, one signal line is used for transmitting one bit signal. However, this method has disadvantages that problems of common-mode noise, simultaneous switching noise, and electro-magnetic interference occur.

FIG. 2 is a diagram showing a schematic configuration of a conventional signal transmission/reception system in which a differential signal transmission method is used.

Referring to FIG. 2, in a transmission/reception system using a conventional differential signal transmission method, two signal lines are used to transmit one bit signal, and a voltage difference between the two signal lines is recognized as information.

In particular, the differential signal transmitting method is used for high-speed signal transmission. In other words, if using the differential signal transmitting method, it is possible to minimize the problems of common mode noise, simultaneous switching noise, and electro-magnetic interference.

However, if using the differential signal transmitting method, there is a disadvantage that twice as many signal lines are required to transmit the same information as compared with the single-ended signaling method. Since reducing the number of signal lines is a very important factor in determining the price of the system, the single-ended signaling method is used in a high-speed memory system, in spite of the conventional problems of common mode noise, simultaneous switching noise, and electro-magnetic interference.

DISCLOSURE

Technical Problem

In order to solve the problems of the prior art as described above, the present invention proposes a signal transmission device and method, and a signal reception. device, capable of obtaining the same effect as the differential signal transmitting method while using a smaller number of signal lines.

Other objects of the present invention may be derived by those skilled in the art from the following examples.

Technical Solution

According to a preferred embodiment of the present invention, there is provided a signal transmission device, comprising: a bit signal generating unit for generating N (an even integer greater than K) second bit signals corresponding to one of signals transmitted from K (one or more integers) first bit signals corresponding to one of the original signals; and a transmitting unit for transmitting the N second bit signals via N signal lines, wherein the number of the original signals and the number of the transmission signals are the same and each of the original signals and each of the transmission signals are matched at 1:1, the bit signal generating unit generates the N second bit signals from the K first bit signals based on the 1:1 matching relationship between the original signal and the transmission signal, and sets N/2 second bit signals of the N second bit signals to have a high voltage and remaining N/2 second bit signals of the N second bit signals to have a low voltage.

The bit signal generating unit generates the N second bit signals from the K first bit signals based on the lookup table in which a 1:1 matching relationship between the original signal and the transmission signal is stored, or may generate the N second bit signals from the K first bit signals through a logic circuit corresponding to the lookup table.

The number of the original signals and the number of the transmission signals may be $2^K$.

In addition, according to other embodiment of the present invention, there is provided a signal reception device, comprising: a receiving unit for receiving N second bit signals corresponding one of the transmission signals via N (an even integer greater than 2) signal lines; and a bit signal decoding unit for generating K (one or more integers) first bit signals corresponding to one of the original signals from the N second bit signals, wherein N/2 signal lines of the N signal lines transmit a second bit signal of a high voltage and remaining N/2 signal lines of the N signal lines transmit a second bit signal of a low voltage, the number of the original signals and the number of the transmission signals are the same, each of the original signals and each of the transmission signals are matched at 1:1, and the bit signal decoding unit generates the K first bit signals from the N second bit signals based on the 1:1 matching relationship between the original signal and the transmission signal.

Further, according to another embodiment of the present invention, there is provided a signal transmission device, comprising: a bit signal generating unit for generating N (an integer greater than K) second bit signals corresponding to one of the signals transmitted from K (one or more integers) first bit signals corresponding to one of the original signals; and a transmitting unit for transmitting the N second bit signals via N signal lines, wherein the number of the original signals and the number of the transmission signals are the same and each of the original signals and each of the transmission signals are matched at 1:1, and the bit signal generating unit generates the N second bit signals from the K first bit signals based on the 1:1 matching relationship between the original signal and the transmission signal, and sets the voltages of the N second bit signals so that a difference between the number of the second bit signals having a high voltage and the number of the second bit signals having a low voltage is one or two.

Furthermore, according to still another embodiment of the present invention, there is provided a signal transmitting method, comprising the steps of: generating N (an even integer greater than K) second bit signals corresponding to one of the signals transmitted from K (one or more integers) first bit signals corresponding to one of the original signals; and transmitting the N second bit signals via N signal lines, wherein the number of the original signals and the number of the transmission signals are the same and each of the original signals and each of the transmission signal, are matched at 1:1, and the generating step is set so that the N second bit signals are generated from the K first bit signals based on the 1:1 matching relationship between the original signal and the transmission signal, wherein N/2 second bit signals of the N second bit signals have a high voltage and remaining N/2 second bit signals of the N second bit signals have a low voltage.

Advantageous Effects

The signal transmission device and method, and the signal reception device according to the present invention has an advantage in that it is possible to obtain the same effect as the differential signal transmitting method while using a smaller number of signal lines.

DESCRIPTION OF DRAWINGS

FIG. 1 is a diagram showing a schematic configuration of a signal transmission/reception system using a conventional single-ended signaling method.

FIG. 2 is a diagram showing a schematic configuration of a conventional signal transmission/reception system using a conventional differential signal transmitting method.

FIG. 3 is a diagram showing a schematic configuration of a signal transmission/reception system according to an embodiment of the present invention.

FIG. 4 is a diagram showing an example of 1:1 matching between an original signal and a transmission signal according to the present invention.

FIG. 5 is a diagram showing a schematic configuration of a transmitting unit of a signal transmission device according to an embodiment of the present invention.

FIG. 6 is a flowchart showing a sign transmission method according to an embodiment of the present invention.

BEST MODE

As used herein, the singular forms "a", "an" and "the" include plural referents unless the context clearly dictates otherwise. In this specification, the terms of "constituting" or "comprising" and the like should not be construed as necessarily including all of the various elements or steps described in the specification, or may not include a part thereof, or may include additional elements or steps. Also, the terms of "part", "module" and the like described in the specification mean units for processing at least one function or operation, which may be implemented in hardware or software or a combination of hardware and software.

Hereinafter, various embodiments of the present invention will now be described in detail with reference to the accompanying drawings.

FIG. 3 is a diagram showing a schematic configuration of a signal transmission/reception system according to an embodiment of the present invention.

Referring to FIG. 3, a signal transmission/reception system 300 according to an embodiment of the present invention includes a signal transmission device 310, N signal lines 320, and a signal reception device 330.

The signal transmission device 310 performs the function of transmitting bit signals, and each of the bit signals is received by the signal reception device 330 via N signal lines 320.

Here, the signal transmission device 310 may transmit K bit signals to the signal reception device 330 via the N signal lines 320. At this time, N is a number greater than K and may be less than 2 k. For example, in the conventional differential signal transmission method, 2 k signal lines are used for transmitting K bit signals, but in the present invention, N numbers smaller than 2 k of the signal lines 320 are used. That is, according to the present invention, the conventional problems of the common mode noise, the simultaneous switching noise, and the electro-magnetic interference may be minimized in the same manner as the differential signal transmission method, while using a smaller number of signal lines than the number of signal lines in the conventional differential signal transmission method.

For this purpose, the signal transmission device 310 according to the present invention includes a bit signal generating unit 311 and a transmitting unit 312 and the signal reception device 330 includes a receiving unit 331 and a bit signal decoding unit 332.

First, the function of each component of the signal transmission device 310 will be described as follows.

The bit signal generating unit 311 generates a transmission signal from the original signal and the transmission unit 312 transmits the transmission signal to the signal reception device 330 via the N signal lines 320.

At this time, the original signal includes K first bit signals as one of the plurality of original signals, and the transmission signal includes N second bit signals as one of the plurality of transmission signals. That is, the bit signal generating unit 311 performs a function of generating N(an even integer greater than K) second bit signals corresponding to one of the transmission signals from the K (one or more integers) first bit signals corresponding to one of the original signals. Here, the K first bit signals of the original signals are data signals, which are bit signals to be sent to the signal reception device 330 by the user, and the N second bit signals of the transmission signals are bit signals distorted from K first bit signals, which are bit signals to be generated when intending to transmit K first bit signals via the N (greater than K) signal lines 320.

At this time, according to an embodiment of the present invention, K is an integer of 1 or more, and N may be an even integer that is greater than K. In particular, K may be an exponent of 2 at 2 to the power of maximum, which is less than the value of $_NC_{N/2}$.

For example, when six signal lines 320 are used, the transmission signal may be composed of six second bit signals, and the original signal may be composed of four first bit signals (the exponent of 2, '4' with respect to '16' which is 2 to the power of maximum being less than a value of probability $_6C_3$ (=20)). As another example, when eight signal lines 320 are used, the transmission signal may be composed of eight second bit signals, and the original signal may be composed of six first bit signals (the exponent of 2, '6' with respect to '64' which is 2 to the power of maximum being less than a value of probability $_8C_4$ (=70)). As another example, when ten signal lines 320 are used, the transmission signal may be composed of ten second bit signals and the original signal may be composed of seven first bit signals (the exponent of 2, '7' with respect to '128' which is 2 to the power of maximum being less than a value of probability $_{10}C_5$ (=252)). As another example, when 12 signal lines 320 are used, the transmission signal may be composed of twelve second bit signals, and the original signal may be composed of nine first bit signals (the exponent of 2, '9' with respect to '512' which is 2 to the power of maximum being less than a value of probability $_{12}C_6$ (=924)).

In addition, the number of the plurality of original signals that can be implemented via the K first bit signals may be $2^K$. For example, there may be four original signals (00, 01, 10, 11) when the first bit signal is two (two bits). As another example, there may be eight original signals (000, 001, 010, 011, 100, 101, 110, 111) when there are three first bit signals (three bits).

Also, the number of transmission signals that can be implemented via the N second bit signals is $2^K$, and each of the original signals and each of the transmission signals mat be matched at 1:1.

FIG. 4 is a diagram showing an example of 1:1 matching between an original signal and a transmission signal according to the present invention.

Referring to FIG. 4, there are 16 original signals when there are four first bit signals. Further, 16 transmission signals are matched at 1:1 with respect to 16 original signals are, respectively. In this case, the number of '1' (high voltage) and the number of '0' (low voltage) are the same number in each of the 16 transmission signals.

The content of the 1:1 matching relationship may be stored in the lookup table within the bit signal generating unit 311.

The operation of the bit signal generating unit 311 will be described with reference to the above description.

According to an embodiment of the present invention, the bit signal generating unit 311 may generate N second bit signals from K first bit signals based on the 1:1 matching relationship between the original signal and the transmission signal. At this time, N/2 second bit signals of the N second bit signals set a high voltage, and the remaining N/2 second bit signals of the N second bit signals may set a low voltage.

In this case, the bit signal generating unit 311 may generate N second bit signals from K first bit signals based on a lookup table in which a 1:1 matching relationship between the original signal and the transmission signal is stored, and generate N second bit signals from the K first bit signals via a logic circuit corresponding to the lookup table.

For example, in the example of FIG. 4, when the signal transmission device 310 intends to transmit the original signal '0111' to the signal reception device 330, the bit signal generating unit 311 searches the transmission signal '001110' corresponding to the original signal '0111' based on the lookup table (at this time, the number of '0' and the number of '1' are equal to each other) based on the look-up table, and generates six second bit signals according to the transmission signal '001110', and the transmission unit 312 transmits the six second bit signals to the N signal lines 320.

Next, functions of the components of the signal reception device 330 will be described as follows.

The receiving unit 331 receives the transmission signal transmitted from the signal transmission device 310 via the N signal lines 320. The bit signal decoding unit 332 generates K first bit signals of the original signals from the N second bit signals corresponding to the transmission signals. At this time, the bit signal decoding unit 332 can generate K first bit signals from the N second bit signals through a 1:1 matching relationship between the original signal and the transmission signal, that is, through a lookup table or circuit logic, wherein the lookup table may have been stored in the bit signal decoding unit 332.

For example, in an example of FIG. 4, when the transmission signal '001110' is received, the bit signal decoding unit 332 may search for the original signal '0111' corresponding to the transmission signal '001110' based on the lookup table.

In summary, a signal transmission/reception system 300 according to an embodiment of the present invention may solve the problems of common-mode noise, simultaneous switching noise, and electro-magnetic interference without using a differential signal transmission method by using an even number of signal lines and further equalizing the number of signal lines having a high voltage to the number of signal lines having a low voltage. Further, in any case, since the number of signal lines having a high voltage and the number of signal lines having a low voltage are the same, the number of signal lines changing from "high voltage to low voltage" and the number of signal lines changing from "low voltage to high voltage" are the same.

FIG. 5 is a diagram showing a schematic configuration of a transmitting unit 312 of the signal transmission device 310. As shown in FIG. 5, when a driver is implemented as in the transmitting unit 312, the amount of current flowing from the power voltage VDD to the ground is equal in any case, thereby solving the simultaneous switching noise problem.

Meanwhile, according to another embodiment of the present invention, K is an integer of 1 or more, N is an integer greater than K, and may be an integer including an even number or an odd number. In this case, the bit signal generating unit 311 may set the voltage of the N second bit signals so that the difference between the number of the second bit signals having the high voltage and the number of the second bit signals having the low voltage among the N second bit signals becomes one or two. Even at this time, the bit signal generating unit 311 and the bit signal decoding unit 332 may also generate N second bit signals from K first bit signals or K first bit signal from N second bit signal based on a lookup table or circuit logic in which a 1:1 matching relationship between the original signal and the transmission signal is stored. In this case, the problems of the common mode noise, the simultaneous switching noise, and the electro-magnetic interference may be minimized similarly to the case where the number of the bit signals having the high voltage and the number of the bit signals having the low voltage are the same.

FIG. 6 is a flowchart showing a signal transmission method according to an embodiment of the present invention. Hereinafter, a process performed in each step will be described.

First, in a step 610, N second bit signals corresponding to one of signals transmitted from the K first bit signals corresponding to one of the original signals are generated.

Next, in a step 620, the N second bit signals are transmitted via N signal lines.

According to the present invention, the number of original signals and the number of transmission signals are the same, wherein each of the original signals and each of the transmission signals may be matched at 1:1. In this case, in the step 610, N second bit signals are generated from K first bit signals based on the relationship between the original signal and the transmission signal which are matched at 1:1, wherein N/2 second bit signals of the N second bit signal are set to have a high voltage and the remaining N/2 second bit signals of the N second bit signals are set to have a low voltage.

The embodiments of the signal transmission method according to the present invention have been described and the configuration related to the signal transmission device 310 described with reference to FIGS. 1 to 5 may be applied to this embodiment. The detailed description thereof will be omitted.

In addition, the above-described technical features may be implemented in the form of program instructions that can be executed through various computer means and recorded in a computer-readable medium. The computer-readable medium may include program instructions, data files, data structures, and the like, alone or in combination thereof. The program instructions recorded in the medium may be those specially designed and constructed for the embodiments or may be available to those skilled in the art of computer software. Examples of computer-readable media include magnetic media such as hard disks, floppy disks, and magnetic tapes, optical media such as CD-ROMs and DVDs, magneto-optical media such as floptical disks, and a hardware device such as ROM, RAM, flash memory, and the like, which is specially configured to store and execute the program instructions. Examples of the program instructions include machine language code such as those produced by a compiler, as well as high-level language code that can be executed by a computer using an interpreter or the like. The hardware device may be configured as one or more software modules to perform the operations of the embodiments, and vice versa.

As described above, the present invention has been described with reference to specific embodiments, such as specific elements, and specific examples and drawings. However, it is to be understood that the present invention is not limited to the above various modifications and variations may be made thereto by those skilled in the art to which the present invention pertains. Accordingly, the spirit of the present invention should not be construed as being limited to the embodiments described, and all of the equivalents of the claims as well as the following claims belong to the scope of the present invention.

The invention claimed is:

1. A signal transmission device, comprising:
a bit signal generating unit for generating an N-bit transmission signal based on a K-bit original signal according to a lookup table in which a plurality of K-bit original signals are associated with a plurality of N-bit transmission signals by 1:1 correspondence; and
a transmitting unit for transmitting the N-bit transmission signal via N signal lines such that each line carries one bit,
wherein K is a natural number, and N is an even number greater than K and less than 2K, and
wherein N/2 bits of the plurality of N-bit transmission signals are set to have a logic high and remaining N/2 bits of the plurality of N-bit transmission signals are set to have a logic low.

2. The signal transmission device according to claim 1, wherein $2^K$ K-bit original signals are respectively associated with $2^K$ N-bit transmission signals in the lookup table.

3. A signal reception device, comprising:
a receiving unit for receiving a N-bit transmission signal via N signal lines; and
a bit signal decoding unit for generating K-bit original signals based on the N-bit transmission signal according to a lookup table in which a plurality of K-bit original signals are associated with a plurality of N-bit transmission signals by 1:1 correspondence,
wherein K is a natural number, and N is an even number greater than K and less than 2K, and
wherein N/2 bits of the plurality of N-bit transmission signals are set to have a logic high and remaining N/2 bits of the plurality of N-bit transmission signals are set to have a logic low.

4. A signal transmission method, comprising:
generating an N-bit transmission signal based on a K-bit original signal according to a lookup table in which a plurality of K-bit original signals are associated with a plurality of N-bit transmission signals by 1:1 correspondence; and
transmitting the N-bit transmission signal via N signal lines such that each line carries one bit,
wherein K is a natural number, and N is an even number greater than K and less than 2K, and
wherein N/2 bits of the plurality of N-bit transmission signals are set to have a logic high and remaining N/2 bits of the plurality of N-bit transmission signals are set to have a logic low.

* * * * *